May 3, 1966 R. H. MURPHY 3,249,842
MULTI-PHASE INVERTERS
Filed Aug. 16, 1962
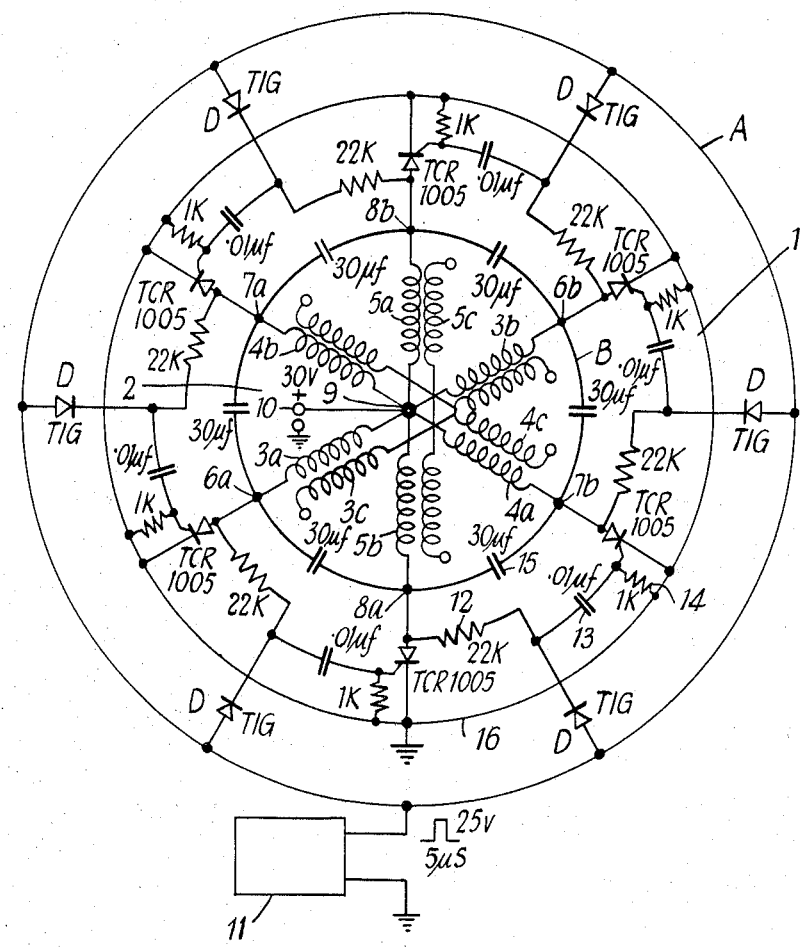
INVENTOR
ROBERT H. MURPHY
BY *Imirie and Smiley*
ATTORNEYS

United States Patent Office 3,249,842
Patented May 3, 1966

3,249,842
MULTI-PHASE INVERTERS
Robert H. Murphy, London, England, assignor to Transitron Electronic Limited, London, England
Filed Aug. 16, 1962, Ser. No. 217,349
Claims priority, application Great Britain, Aug. 17, 1961, 29,750/61
5 Claims. (Cl. 321—5)

This invention relates to multiphase inverters of the kind which produce a multiphase alternating current output from a direct current input, without the use of rotating or vibrating parts by controlling the direction of flow of current through the primary windings of a transformer or group of transformers by means of a switching circuit.

Conventional static inverters of this kind usually produce rectangular output voltage waveforms or waveforms comprising rectangular steps which require extensive filtering to eliminate ripple effects and need an extremely complex switching circuit in order to ensure correct synthesis and phase relationship of these output waveforms.

It is an object of this invention to provide an inverter capable of producing output waveforms that closely approximate the sinusoidal and thus have a minimum output ripple, and having an output frequency dependent only on the natural frequency of a simple pulse generator which can be accurately adjusted to extremely stable frequency settings over a wide range.

From a further aspect the invention provides an inverter of the kind referred to comprising a transformer having a number of half primary windings, each pair of which is wound on a distinct core, a number of secondary windings, and an adjustable progressive switching circuit for applying a given input to each primary in some cyclic order.

The adjustable progressive switching circuit may be a pulse-triggered anode or cathode commutated ring counter using semi-conductors. Such a circuit is an adaptation of a conventional thyratron type ring counter, and has a switching frequency accurately controlled by the trigger pulse frequency. The principle of the inverter is directly analogous to that of the simple three phase alternator; the rotating magnetic field being derived from the sequential switching of currents by means of the ring counter through the multiple primaries of the transformer or transformers as opposed to the mechanical rotation of a single coil carrying D.C. current. The ring counter configuration is thus used not only to enable a simple repetitive single pulse output triggering circuit to control the whole operation of the inverter, but in conjunction with the transformer or group of transformers, to synthesise output waveforms which maintain a close approximation to the sinusoidal and have the correct phase relationship to each other solely by virtue of this analogous rotational symmetry of the sequentially switched currents.

Capacitors in the ring counter, in addition to their conventional function of commutating the semi-conductors in order to sequentially switch the currents, aid the synthesis of the sine-wave outputs by enabling them to be composed of exponential rather than rectangular steps and allow the use of either a single multiphase transformer or a group of single-phase transformers for the purpose of combining the outputs into a balanced multiphase system.

It has been established, as part of the invention, that sequential switching of a capacitor commutated ring counter with resistive loads will generate approximate sine-waves across diametrically opposite output terminals of the ring.

These and other parts of the invention are embodied in a preferred form of the invention which will now be described by way of example with reference to the accompanying drawing which is a circuit diagram of a three-phase inverter.

The three-phase inverter comprises an input switching circuit generally 1 and a single three-phase transformer (or group of three-phase transformers) generally. Two bifilar half-primary windings 3a, 3b, 4a, 4b, 5a, 5b are used on each of the three limbs of the transformer so as to comprise one centre-tapped primary winding, opposite ends of which are connected to two diagonally opposite stages 6a, 6b, 7a, 7b, 8a, 8b of a six-stage ring counter comprising the input switching circuit, the centre taps 9 being used as the supply terminal from a D.C. source 10. Secondary windings 3c 4c, 5c on each of the three limbs, are connected in star or delta after being arranged in the correct sense to produce a three-phase output.

The ring counter that is all the circuit between the pulse line A and the capacitor chain B, including the pulse generator 11 is a version of the conventional thyratron type ring counter adapted for the use of silicon controlled rectifiers.

Each primary is connected through a triggerable silicon controlled rectifier SCR to an earth rail 16. The collector of this rectifier is connected through a resistance 12 and capacitor 13 to the gate of the silicon controlled rectifier SCR associated with the next succeeding primary winding and this gate is connected to the earth rail through a resistance 14. A steering diode D is connected between the pulse line A and the connection between resistance 12 and capacitor 13. The pulse generator 11 is connected between the pulse line A and earth. The ends of successive primary windings are connected by capacitors 15 forming the capacitor chain B. This counter being developed to enable it to switch currents in the range 0–20 amp. or more at frequencies corresponding to counting rates of theoretically 0–80 kc./s. or more, and yet maintain an extremely compact and reliable configuration. Appropriate values of the resistances and capacities are indicated in the drawing.

The described circuits can be viewed as a cyclic ladder of RC differentiating networks on which the point of step function excitation is moved progressively round the loop at a constant switching speed. This network geometry is ideally suited to the use of silicon controlled rectifiers as the switch contacts because the capacitors can then be used for commutation purposes.

With this special network geometry there is an optimum value of the commutating capacitor—resistive load time constant—that causes the output waveform to consist of a series of exponential steps smoothly joined up to give a god approximation to a sinewave. By taking such waveforms from all pairs of diametrically opposite concontacts, a polyphase voltage system is established.

Assume that one stage in the loop, diode D, is conducting. In the absence of a trigger pulse, the reverse voltage across the succeeding diode will be equal to the forward conducting voltage of the silicon controlled rectifier, TCR, connected thereto (of order 1–2 v.), whereas, since all the other stages are "off," the other diodes will be reverse biased to a much greater extent (of order Vs volts). A positive trigger pulse, as shown, will thus bias only this one succeeding diode into conduction, and will trigger the succeeding silicon controlled rectifier via the coupling capacitor 13. The action of the relevant commutating capacitor 15 will then switch the original stage off. Thus each successive trigger pulse steps the "count" one stage around the ring, hence allowing the necessary synthesising action to take place.

The output obtained when the commutating capacitors are chosen to have a theoretically optimum value depending on switching frequency and load is a three phase system in which each sinewave is the result of a synthesis of exponential portions and the departure of any point on the waveform from that of a corresponding true sine-wave is relatively small. In fact this "ripple" is predominantly of the sixth harmonic variety and consequently may thus be filtered to obtain any required degree of purity without difficulty.

In an inverter with a larger number of stages the harmonic of the ripple would be the same as the number of stages and the approximation to sinusoidal would become progressively closer as the number of stages are increased, thus making filtering unnecessary for most practical purposes.

By adoption of the three-phase system the load reflected into the ring counter stages remains approximately constant, in the same way as the mechanical load of a three-phase alternator is approximately uniform over the complete revolution of the armature, and hence, the potential efficiency of the system is extremely high. In addition, the stress placed on the individual SCR's in the ring counter is so nearly uniform that they may be used at nearer to their maximum rated capacity than in any other known type of SCR inverter. Thus for the maximum capacity of SCR's currently available the output power obtainable for this type of inverter is potentially higher than for any other type and well into the kilowatt region. Conversely, the safety factor when used at any specific power level is higher than that for any other known type of SCR inverter when operated at the same power.

It will be understood that the invention is not restricted to the details of the specific embodiment described which may be varied without departing from the scope of the accompanying claims.

I claim:

1. An inverter for converting direct current to polyphase alternating current, comprising a transformer having a plurality of center tapped primary windings and associated secondary windings each pair of primary and secondary windings being wound on a separate core, a source of D.C. potential connected across ground and a common terminal to which all of the center taps of said primary winding are connected, said secondary windings having end terminals serving as output terminals for individual phases of a polyphase A.C. output, a plurality of switch means each connecting one end of one of said primary windings to ground, and means for progressively and sequentially operating said switch means to generate a rotating magnetic field in said transformer windings by causing flow of direct current from said common terminal through the primary half windings in turn to ground.

2. An inverter according to claim 1 wherein said primary windings are provided with end terminals each of which is connected to the end terminal of the next adjacent primary winding through a capacitor.

3. An inverter according to claim 2 wherein said transformer cores are geometrically disposed radially to form substantially equal angles about a center.

4. An inverter according to claim 3 wherein said means for progressively and sequentially operating said switch means includes a pulse generator, and circuit means interconnecting the pulse generator with said plurality of switch means.

5. An inverter according to claim 4 wherein said switch means comprises a plurality of semiconductor devices and said circuit means interconnecting the switch means comprises a cyclic ladder of resistor, capacitor networks constituting a ring counter having a plurality of stages equal to the number of said plurality of switch means.

References Cited by the Examiner

UNITED STATES PATENTS

| 2,199,281 | 4/1940 | Clark | 321—36 |
|---|---|---|---|
| 2,953,735 | 9/1960 | Schmidt | 321—5 |
| 3,052,833 | 9/1962 | Coolidge et al. | 321—5 |
| 3,176,211 | 3/1965 | Linn | 321—5 |

LLOYD McCOLLUM, *Primary Examiner.*

G. J. BUDOCK, J. C. SQUILLARO, W. H. BEHA,
*Assistant Examiners.*